July 5, 1966  S. A. MALTHANER  3,259,437
WHEEL RIM CLAMP DEVICE
Filed July 15, 1964  2 Sheets-Sheet 1
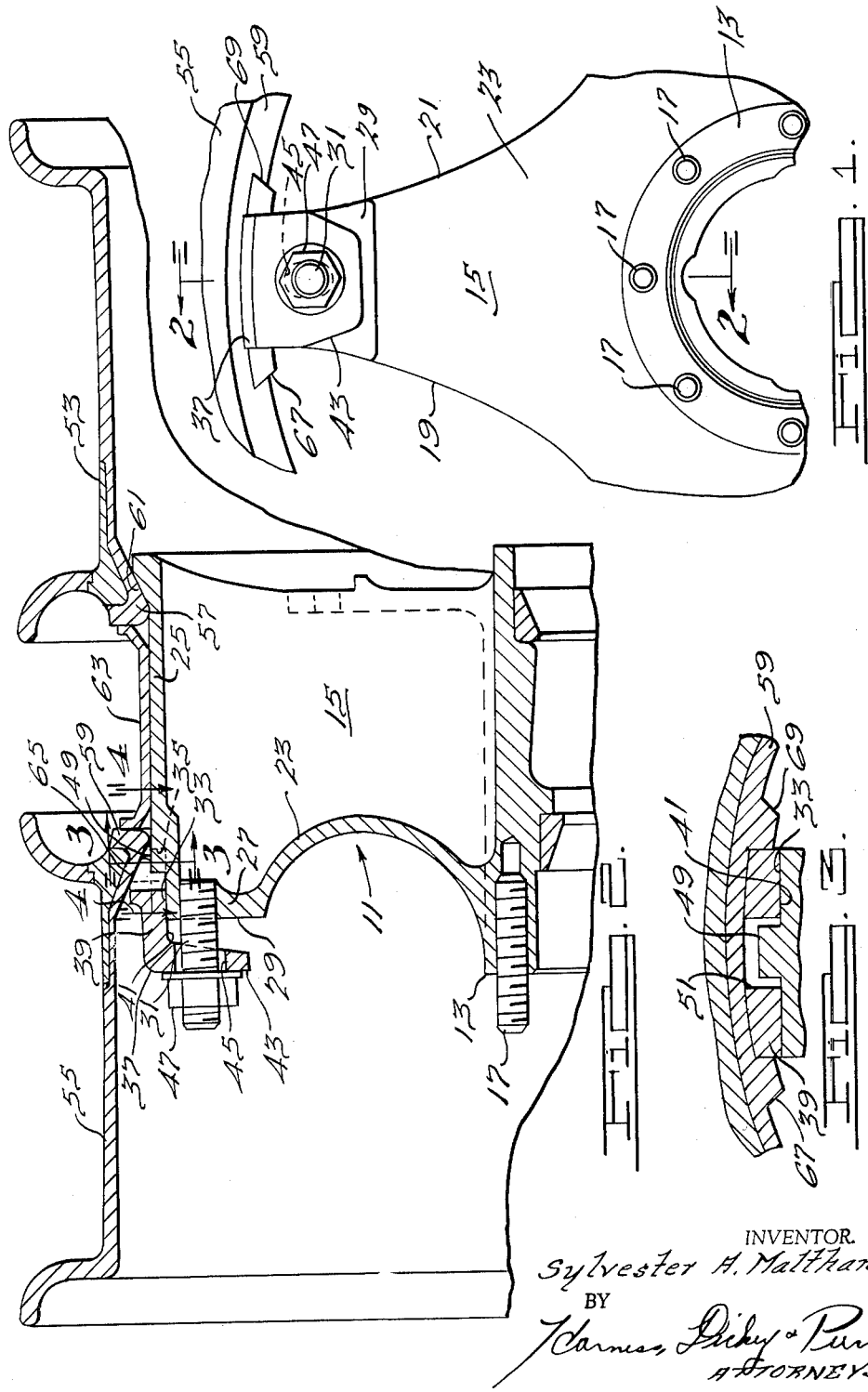
INVENTOR.
Sylvester A. Malthaner
BY
Harness, Dickey & Pierce
ATTORNEYS.

July 5, 1966     S. A. MALTHANER     3,259,437
WHEEL RIM CLAMP DEVICE
Filed July 15, 1964                            2 Sheets-Sheet 2
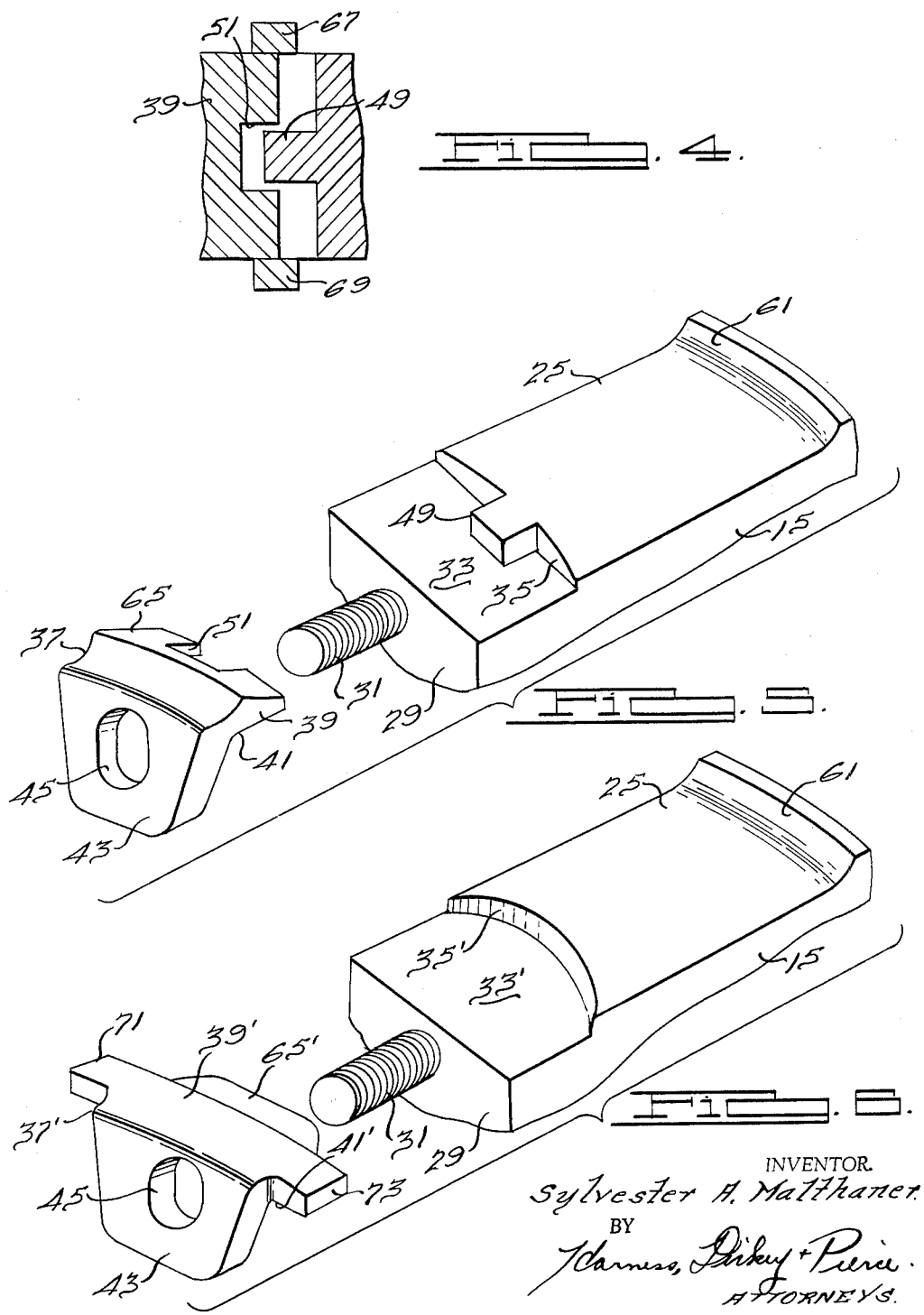
INVENTOR.
Sylvester A. Malthaner
BY
Harness, Dickey + Pierce
ATTORNEYS United States Patent Office 3,259,437
Patented July 5, 1966

3,259,437
WHEEL RIM CLAMP DEVICE
Sylvester A. Malthaner, Rockford, Ill., assignor to Kelsey-Hayes Company, Romulus, Mich., a corporation of Delaware
Filed July 15, 1964, Ser. No. 382,781
8 Claims. (Cl. 301—12)

The present invention relates to automotive wheels and particularly to a self-tightening clamp for detachable tire rims.

The wheel referred to herein and with which the present invention finds use is one which is used on vehicles such as trucks, tractors and trailers and includes a cast body having a hub and a plurality of radially extending spokes on which one or two rims are removably clamped adjacent the spoke ends. A pneumatic tire is mounted on each of the rims and the assembled wheel, in turn, is mounted on the vehicle.

One of the problems encountered in the use of this type of wheel, and especially in a dual wheel assembly, is that of preventing relative angular movement between the rim and the wheel, hereinafter referred to as "rim slippage." Thus, when the vehicle driver drops in the clutch abruptly or panic-brakes the vehicle, a relatively high torsional force is generated between the cast body and the rims due to the body attempting to overrun the rims in the first instance and vice-versa in the second instance. The result will be to cause relative angular movement between the rim and body or rim slippage. Minute wear will arise in the rim clamp assembly from this slippage which will destroy the clamp assembly torque. The rim will eventually become sufficiently loose on the wheel to permit undesirable wobbling and rim slippage in subsequent similar high torque conditions causing at each instance more wear between the wheel body and rim which might necessitate repair or replacement of one or more of the wheel assembly elements.

The present invention contemplates the provision of an improved rim clamping device adapted for use in either a single or a dual wheel assembly and which is self-tightening in nature under the above high torsional conditions. Thus, when the rim and the wheel are subjected to severe torsional forces tending to cause relative angular movement therebetween, the effect will be to tighten the clamping force for the rim on the wheel assembly.

A primary object, therefore, of the present invention is to provide a rim clamp device for an automotive wheel assembly which precludes undue wear of the wheel or wheel rim assemblies resulting from severe wheel torsional stresses.

It is a further object of the present invention to provide a rim clamp device for an automotive wheel assembly of the above character which will utilize the torque tending to produce relative angular movement between the rim and the wheel in either direction to cause tightening of the clamping force.

It is a further object of the present invention to provide a rim clamp device for an automotive wheel assembly of the above character which is self-tightening in operation.

It is a further object of the present invention to provide a rim clamp device of the above type which is adapted for use on either a single or a dual automotive wheel assembly.

It is a further object of the present invention to provide a single rim clamp device for a dual automotive wheel assembly which will utilize the torque tending to produce relative angular movement between the rims and the wheel in either direction to tighten the clamping force on both rims.

It is still a further object of the present invention to provide a rim clamp device of the above type which is relatively inexpensive to manufacture, sturdy in construction and reliable in use.

Further objects and advantages of the present invention will become more apparent from the following detailed description taken in conjunction with the drawings in which:

FIGURE 1 is a fragmentary elevational view of a wheel assembly embodying the principles of the present invention;

FIGURE 2 is a sectional view of the structure of FIGURE 1 taken along the line 2—2 thereof;

FIGURE 3 is an enlarged sectional view of the structure of FIGURE 2 taken along the line 3—3 thereof;

FIGURE 4 is an enlarged sectional view of the structure of FIGURE 2 taken along the line 4—4 thereof;

FIGURE 5 is an exploded perspective view of a portion of the structure of FIGURES 1-4; and FIGURE 6 is an exploded view similar to FIGURE 5, showing a modified form of rim clamp assembly constructed according to the principles of the present invention.

Referring now more specifically to the drawings, and particularly FIGURES 1-5, an automotive wheel body indicated generally at 11 is seen to include a central hub 13 having a plurality of angularly spaced radially extending spokes 15. The hub 13 is adapted to receive suitable anti-friction bearings (not shown) and may be provided with suitable means such as studs 17 by which a wheel drive adaptor (not shown) may be drivingly secured to the wheel body. The spokes 15 may be of the conventional hollow configuration having a pair of arcuate side walls 19 and 21 interconnected by an outboard side wall 23. All of the side walls 19, 21 and 23 are interconnected at their radially outer ends by a rim supporting end wall 25. Each of the spokes 15 may be open at its inboard side; however, this may vary according to particular needs.

The rim supporting end walls 25 all lie on a common cylinder for supporting annular rims in a manner hereinafter described. A boss 27 is formed at the radially outer end of each of the rims' outboard side walls 23 and each boss 27 is provided with an outboard facing radially extending shoulder 29. A rim clamp mounting stud 31 is received in the boss 27 and extends outboard thereof in the usual manner.

The rim supporting end walls 25 are each formed at their outboard portion with a notch having a flat axially extending surface 33 and a generally radially extending surface 35 (see FIGURE 5). The flat surfaces 33 are preferably formed tangent to a circle having its center coincident with the wheel center. A plurality of rim clamps 37 are each formed with a base portion 39 having a flat face 41 adapted to rest on the flat surface 33 of a respective one of the spokes 15. A leg portion 43 is formed generally at right angles to the base portion 39 and each has an opening 45 adapted to loosely receive the stud 31. A clamp nut 47 is received on each of the studs 31 and is adapted to engage the outboard leg portion 43 of the adjacent clamp 37.

Each of the rim supporting end walls 25 may be formed with a projecting lug 49 extending axially of the radial wall 35 and radially of the flat surface 33. These lugs 49 have a lateral dimension sufficiently smaller than the lateral dimension of a notch 51 formed in the adjacent clamp base portion 39 so as to permit limited relative movement therebetween (see FIGURE 4).

In the device shown in FIGURE 2, a pair of tire rims including an inboard rim 53 and an outboard rim 55 are shown as positioned on the wheel body with each of the rims being formed with a conventional mounting flange 57 and 59, respectively. As shown, the mounting flange 57 of the inboard rim is adapted to seat against a standard 28° inboard rim ramp 61 on the end walls 25 and is separated from the outboard rim by a conventional annular spacer 63. The mounting flange 59 of the outboard rim is engaged by a suitably beveled arcuate surface 65 formed on each of the clamp body portions 39.

To assemble the rims on the wheel, the inboard rim 53 is placed with the flange 57 engaging the rim ramp 61. Thereafter, the spacer 63 and the outboard rim 55 are positioned as shown in FIGURE 2 with the lugs 49 serving to maintain proper radial positioning of the outboard rim. The clamps 37 are mounted on the studs 31 and in wedging engagement with the outboard rim 55. The nuts 47 are threaded on the studs 31 and will drive both the outboard rims 55 and inboard rims 53 axially on the wheel body as well as to slide the clamp body 39 axially along the flat surface 33 a predetermined extent.

Additionally, the outboard rim 55 may be provided with a plurality of pairs of spaced driving lugs 67 and 69 formed integral or secured thereto as by welding and positioned closely adjacent the side edges of the clamp body portions 39 to form a positive mechanical drive therebetween (see FIGURE 3). Thus, after the rims and clamps have been assembled on the wheel body, relative angular movement between the outboard rim 55 and the rim clamps 37 will be prevented.

In use, the wheel and rims are assembled as above and the rims are adapted to carry conventional inflatable tires in the usual manner. Under normal driving conditions, driving torque applied to the wheel axle will be transmitted to the wheel body and thence to the rims and tires to drive the vehicle. The nuts 47 will be tightened axially to permit these torsional forces to be transmitted without relative angular movement occurring between the rims and the wheel. However, under severe torque conditions, as for example when the driver either drops the clutch in abruptly or panic brakes the vehicle, the torque transmitted through the rims and rim clamps will be increased considerably. Ordinarily, these severe torque conditions would cause the rim to slip relative to the clamps and wheel resulting in wear between the outboard rim 55 and the clamps 37 as well as to impose severe strain on the studs 31. This wear in time permits play between the clamp and the outboard rim with the result that both the outboard and inboard rims will slip relative to the wheel body. Thus, after only limited use, the vehicle operator would need to stop and tighten the nuts 47 to re-establish positive wheel driving conditions and prevent the wheel rims from wobbling.

The rim clamp assembly of the present invention, however, will use any relative angular movement between the rim and wheel body to further tighten the driving connection therebetween. Thus, if the outboard rim slips relative to the wheel body, it will either by the lugs 67 and 69 engaging the clamps 37 or, in the event the lugs 67 and 69 are omitted, simply by the frictional contact between the rim and clamp cause the clamps 37 to move angularly and conjointly with the rim relative to the wheel body. However, since the faces 33 and 41 are flat and form a tangent to a cylinder coaxial with the wheel body, any relative angular movement between the clamps 37 and the wheel body will cause the clamps to wedge the outboard rim 55 radially outwardly and in an inboard direction. This will increase the clamping force exerted by the clamp 37 on the outboard rim 55. Additionally, as the rim 55 moves angularly relative to the clamps 37, engagement between the beveled surfaces 65 and the flange 59 will cause the rim 55 and consequently the rim 53 to be forced axially inboard of the wheel 11 and this will increase the force with which the mounting flange 57 of inboard rim engages the rim ramp 61. Thus, initial slippage between the outboard rim and the wheel body will effect a tighter clamping force on the rim 55 and 53 and will prevent any further slippage. Additionally, this rim clamping arrangement will be effective against severe torque conditions in both angular directions. Thus, severe clutching and braking of the vehicle by the operator will result in a tendency for the rims to slip in opposite directions relative to the wheel body. However, the flat faces 33 and 41 on the spokes 15 and clamps 37, respectively, will permit this increased wedging and clamp tightening effect on the outboard and inboard clamp for either directional rim slippage. Therefore, severe torque conditions will not destroy the rim clamping effect on the wheel rim assembly of the present device. On the contrary, any rim slippage will function to increase the rim clamping force.

The spoke and clamp wedging surfaces 33 and 41, respectively, are designed so that the extent to which the outboard rim 55 is deflected will be enough to increase the rim clamping force to the desired extent but not so much as to upset wheel balance.

A modification of the clamping device of the present invention is shown in FIGURE 6. In this device the end walls 25 for the spokes 15 are formed at their axial outboard portion with a notched portion having an axially extending flat surface $33^1$ and a generally radially extending concave surface $35^1$. This flat surface $33^1$ is formed, as was surface 33 of the device of FIGURES 1–5, tangent to a cylinder coaxial with the wheel body. However, the surface $33^1$ is adapted to be machined to high precisional accuracy and this is permitted by the elimination of the rim locating lug therefrom. The clamp $37^1$ used in this modification has a leg portion 43 with a stud opening 45, the same as in FIGURES 1–5. However, this clamp has a body portion $39^1$ formed with a flat undersurface $41^1$ positioned to engage surface $33^1$ and a segmental wedge end portion $65^1$. The radial end wall surface $35^1$ will freely receive the wedge end portion $65^1$ and by its end lug-like portions is adapted to initially support and center the outboard rim 55 radially on the spokes 15. Additionally, the clamp body portion $39^1$ may be formed with a pair of extensions 71 and 73, laterally thereof, for engagement with the lugs 67 and 69 formed on the outboard rim 55 to form a positive mechanical drive therebetween.

The assembly and operation of this device is substantially identical with that of the device of FIGURES 1–5; therefore, a detailed discussion of the same is omitted here.

While preferred embodiments of the present invention have been illustrated and described in detail hereinabove, various additions, substitutions, modifications and omissions may be made thereto without departing from the spirit of the invention as encompassed by the appended claims.

What is claimed is:

1. An automotive wheel assembly including a wheel body provided with a plurality of radially extending spokes each having an arcuate outer surface, at least one annular rim disposed around said spoke outer surfaces, a clamping means carried by at least one of said spokes and adjustable axially thereof, means positively interconnecting said clamp means and said rim for conjoint rotation, said clamping means being movable laterally of said spoke and engaging said rim and having a flat surface positioned to engage an axially extending flat surface formed on said spoke substantially normal to a radius of said wheel passing through the center of said spoke and spaced radially inwardly from the spoke outer surface, said flat surfaces on said spoke and clamping means being substantially coextensive in a lateral direction and extending substantially the full lateral width of said spoke, whereby relative angular movement between said rim and wheel will cause said clamp to move laterally relative to said wheel to thereby increase the clamping force on said rim.

2. A wheel assembly according to claim 1 which includes a pair of axially spaced rims disposed around said spoke outer surfaces and wherein said clamping means engages and is interconnected with the outboard one of said rims.

3. A wheel assembly according to claim 1 which includes a clamping means carried by each of said spokes and engaging said rim.

4. A wheel assembly according to claim 1 wherein said rim and said clamping means are formed with tapered interengaging radially inwardly and outwardly facing surfaces.

5. A wheel assembly according to claim 1 wherein said clamping means has a wedge surface opposite said flat surface thereon engaging said rim at the inner portion thereof.

6. A wheel assembly according to claim 1 which includes lug means on said at least one spoke extending radially outwardly from said flat surface on said spoke adapted to initially support said rim and wherein said clamping means is provided with slot means receiving said lug means and allowing lateral movement of said clamping means relative to said spoke.

7. A wheel assembly according to claim 1 which includes lug means on said at least one spoke extending radially outwardly from said flat surface on said spoke adapted to initially support said rim.

8. A wheel assembly according to claim 2 wherein said flat surface on said spoke is outboard relative to the arcuate surface thereon and which includes means for moving said clamping means axially inboard to increase the clamping force on said rims whereby relative angular movement between said outboard rim and said wheel deflects said outboard rim radially outwardly and causes said outboard rim to move axially inboard of said wheel increasing the clamping force on the axially inboard rim.

References Cited by the Examiner

UNITED STATES PATENTS

| | | | |
|---|---|---|---|
| 1,790,421 | 1/1931 | Holt | 301—12 |
| 2,486,569 | 11/1949 | Malthaner | 301—13 |
| 3,039,824 | 6/1962 | Walther | 301—20 |

FOREIGN PATENTS 788,467 7/1935 France.

BENJAMIN HERSH, *Primary Examiner.*

R. J. JOHNSON, *Assistant Examiner.*